Aug. 7, 1962 M. SCHIBLI ET AL 3,048,239
ELEVATOR CONTROL SYSTEM
Filed Sept. 27, 1960 6 Sheets-Sheet 1

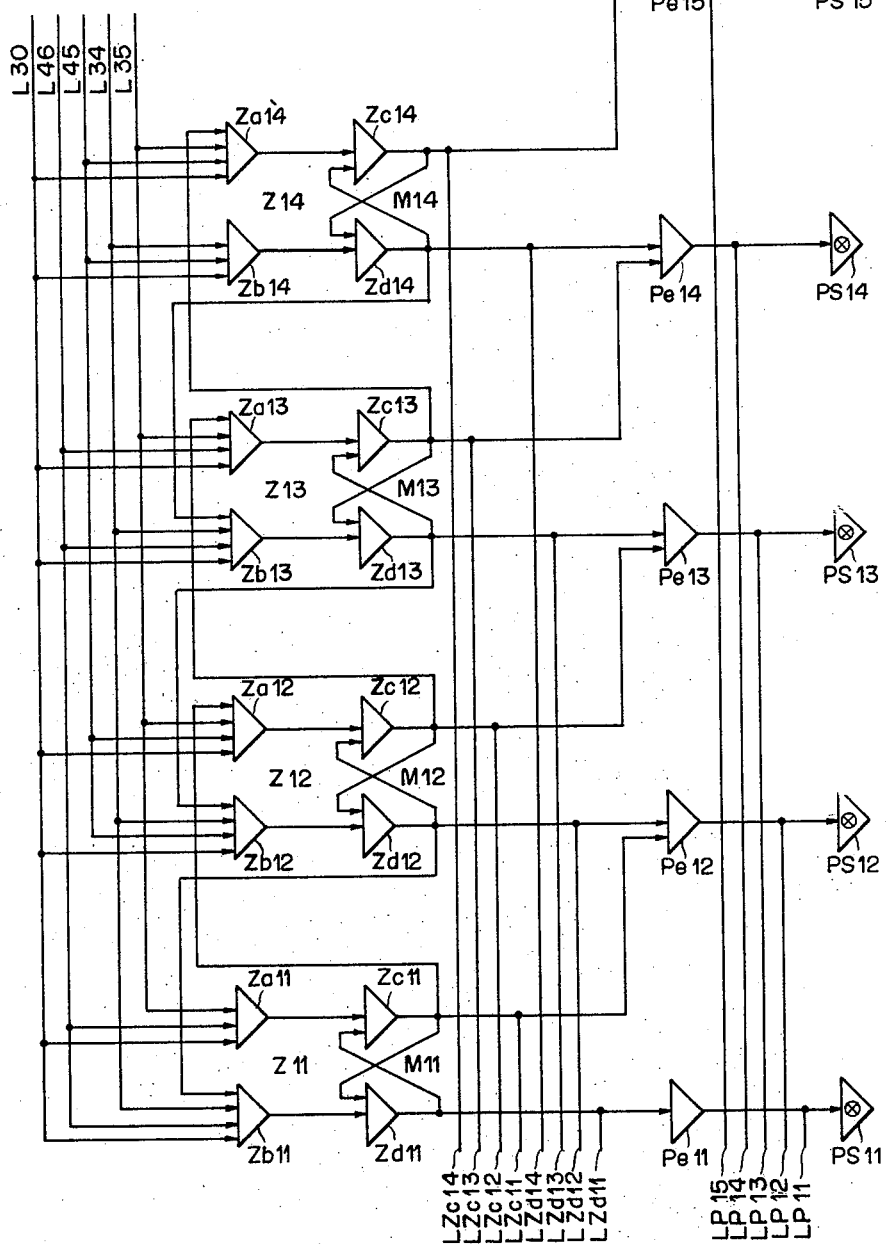

United States Patent Office 3,048,239
Patented Aug. 7, 1962

3,048,239
ELEVATOR CONTROL SYSTEM
Marcel Schibli, Zurich, and Marcel Leroux, Geneva, Switzerland, assignors to Schweizerische Wagons- und Aufzugefabrik A.G., Schlieren-Zurich, Schlieren, Zurich, Switzerland
Filed Sept. 27, 1960, Ser. No. 58,832
Claims priority, application Switzerland Sept. 28, 1959
4 Claims. (Cl. 187—29)

The present invention relates to an elevator control system which utilizes statical elements.

The known elevator control systems are generally constructed with conventional relays. These relays frequently interfere with routine operations by necessitating repair due to dirtying and wear of the movable parts. Also quite often this conventional type of control does not meet the requirements for rapid switching.

It is an object of the present invention to avoid these drawbacks by the provision of an elevator control system having uniform and economical statical elements.

In the elevator control system according to the present invention, call responsive memory elements and a control member determining the position of the cabin influence the elements associated with the floors to determine the direction of travel of the cabin.

Preferably the elements determining the direction of travel influence the corresponding travel direction relay. According to the type of control and to the control member used for determining the position of the cabin, for example shaft switches, copying means, step by step switch etc. it may be advantageous to have the elements determining the direction of travel acting onto the corresponding travel direction relay over a memory element.

Other features and advantages of the invention will become apparent from the description now to follow, of a preferred embodiment thereof, given by way of example only and in which reference will be made to the accompanying drawings in which:

FIG. 1 diagrammatically illustrates elevator apparatus in which the travel distance of the cabin is divided into signal zones.

FIG. 3a illustrates zone units and corresponding positioning and signal elements for a step-by-step switching device.

Figure 1:
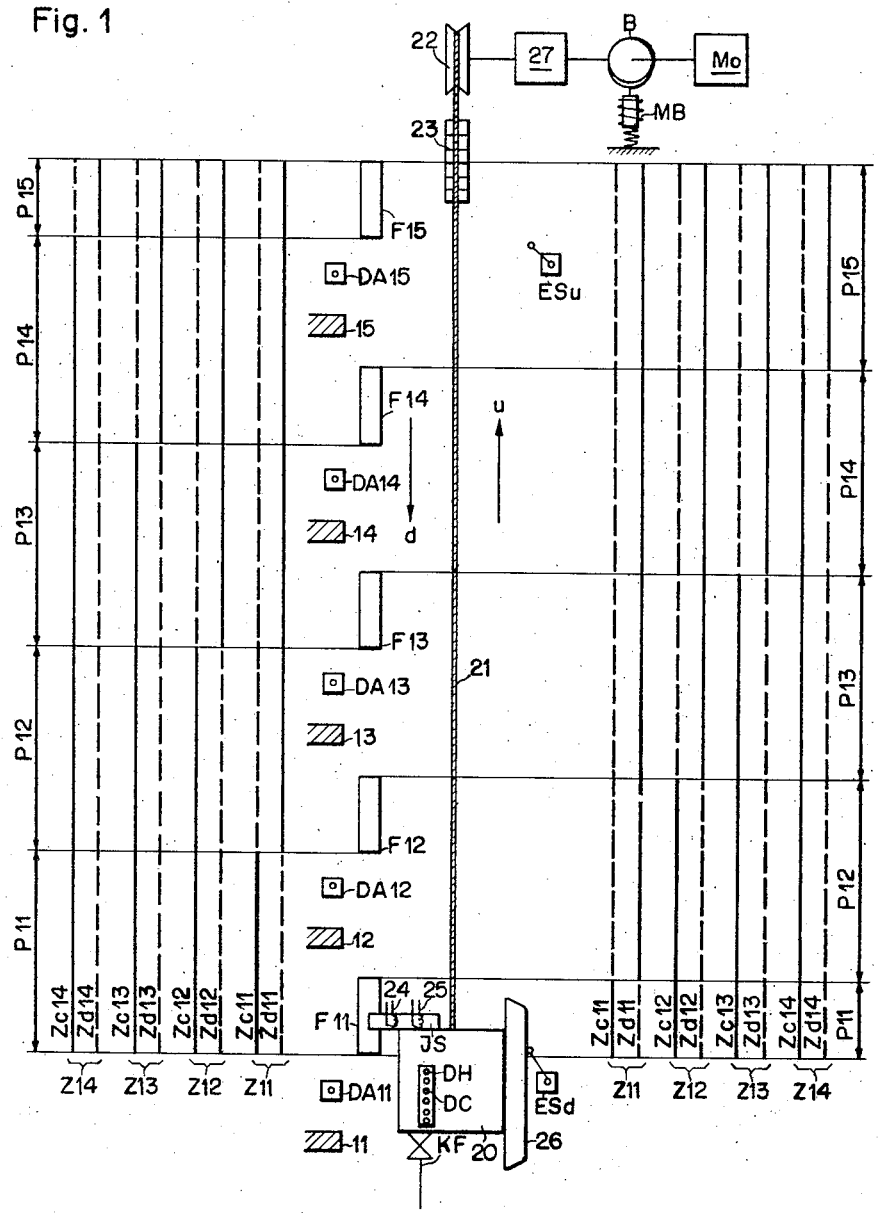

Referring now to the drawings in FIG. 1 reference numeral 20 designates an elevator cabin connected by means of cables 21 which pass over a driving disc 22 and which are connected to a counterweight 23. The driving disc 22 is mounted on the slowly rotating shaft of a gear 27 driven by an induction motor $Mo$. A brake B is mounted between the gear 27 and the motor $Mo$ and is actuated by a magnet MB.

The cabin 20 can move between stops 11 to 15. At each of these stops there is provided an outside call button DA11–15. In the cabin 20 itself there are arranged call buttons DC. On the top of the cabin 20 there is arranged a generator in form of an induction switch JS having a primary winding 24 and a secondary winding 25. The primary winding 24 is supplied with A.C. and produces in the secondary winding 25 over an air gap an output A.C. which is transformed, in a known way in a rectifier, into a D.C. signal. The shaft contains lugs F11–F15 which, at the passage of the cabin 20, project into the air gap of the induction switch JS and interrupt the D.C. signal so as to produce a signal sequence. Furthermore, a slide path 26 provided at the cabin 20 operates a pair of end switches ES$d$ and ES$u$ at the end stops. If the end switch ES$d$ or ES$u$ respectively is operated by the slide 26, an output signal 0 is produced at this switch.

FIG. 1 further shows that the elevator travel distance is divided into $n-1$ zones, whereby $n$ indicates the number of the stops. To each of these zones is associated a zone unit having outputs $Zc$ and $Zd$. These zone units are described with reference to FIGURE 2a in which the uninterrupted lines correspond to a signal value 1 and the interrupted lines to a signal value 0, whereby the value 1 of the element $Zc$ represents the distance below the corresponding lug F to the lower end stop and the value 1 of the element $Zd$ represents the distance of the corresponding lug F to the upper end stop. A signal value is designated by 1 or 0 respectively according to whether or not it presents a voltage with respect to a reference potential in the corresponding conductor. The output of the induction switch JS from a lug F leads to a modification of the output values of the corresponding zone units. Since the output from the lug F starts the signal change, the place of this change is different for the upward movement $u$ and for the downward movement $d$ as appears from FIG. 1. In order to determine the position of the cabin, use is made of a further element, namely a so-called position element P$e$ as it is described in FIG. 3$a$, and which is capable of evaluating the output values of two adjacent zone units whereby this position is indicated by the distances P11, P12 etc. From the following description it will appear that the output values of the zone units are further used to determine the travel direction.

The embodiment of the control is based on a statical element producing an output signal 1 when all input signals have the value 0 and producing an output signal 0 as soon as at least one input signal takes the value 1. Such a statical element is generally designated as a "nor"-element. The lugs F are adjusted in such manner that the corresponding lug projects into the air gap of the induction switch JS when the cabin stops at a stop. Therefore the secondary winding 25 produces no signal so that $JS=0$.

The floor control according to FIGURES 2 and 2$a$ is provided with cabin push buttons DC supplied over a safety circuit SS, as will hereinafter be described for FIG. 4, and over an auxiliary contact KB of the brake B. Furthermore, outside push buttons DA corresponding to the number of stops are provided and the supply thereof is guided over a floor contact KF which switches off the outside push buttons DA when the cabin is occupied. The signal of the safety circuit SS is further guided over a lead LSS to the input of an element 50, the output signal of which, supplies a lead L50. The output signal is operative to reset the memory elements MS (FIG. 2) and MF (FIG. 2$a$) of the floor control when the safety circuit SS is interrupted. For each stop there is provided a memory element MS consisting of elements $Sa$ and $Sb$. Each element $Sa$ has three inputs the first input being connected with the corresponding push button DA, the second with the corresponding push button DC and the third with the output of the associated element $Sb$. Element $Sb$ has a first input leading to the output of the associated element $Sa$. Moreover, the element $Sb$ has two inputs for resetting the memory element MS. One of these inputs is connected to lead L50 and the other to the corresponding lead LP.

Figure 3:
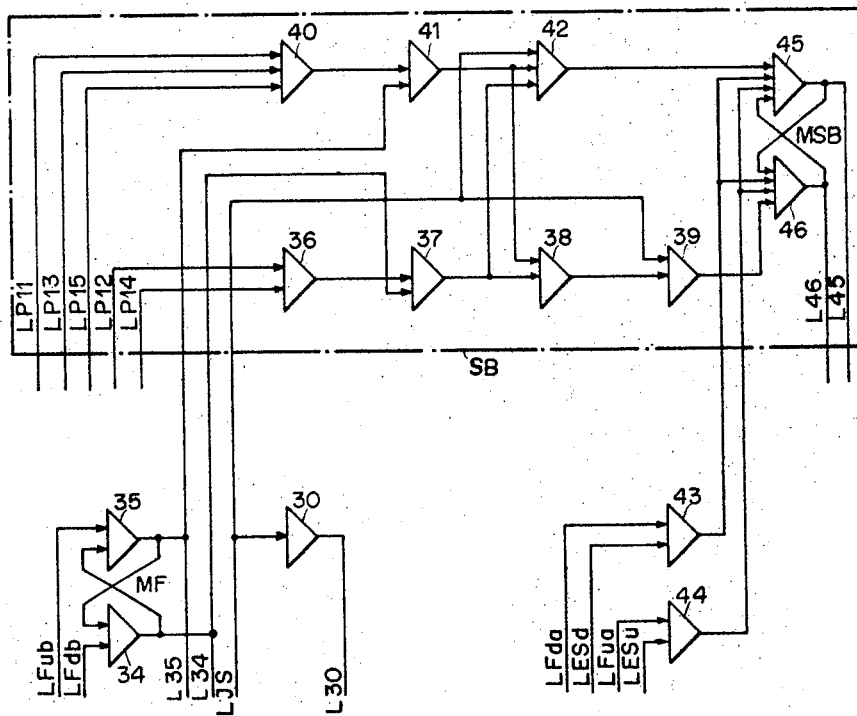
FIG. 3 represents a step limiter for a step-by-step switching device.

From the following description of FIGS. 3 and 3$a$ it will appear that the position of the cabin is determined by the position elements P$e$. In order to render possible a travel of the cabin, further elements are required for determining the direction of travelling of the cabin. Such elements must be able to ascertain whether a call is made from above or below of the position of the cabin. To this end, elements F$g$, F$h$, F$i$ and F$k$ are provided. The elements F$g$ and F$h$ serve to determine the downward travel and the elements F$i$ and F$k$ serve to determine the upward travel. The elements F$g$ and F$i$ are floor dependent and have an index of number whereby it must be considered that an upward or downward travel may be started from $n-1$ stops only.

Each element F$g$ has two inputs one of which is connected with the output of the corresponding element S$a$ and the other of which is connected with the corresponding lead LZ$c$. The outputs of the elements F$g$ serve as inputs to an element F$h$ the output of which acts onto a lead LF$h$. Each element F$g$ has two inputs the first of which leads to the corresponding output of element S$a$ and the second of which leads to the corresponding lead LZ$d$. The outputs of the element F$i$ serve as inputs to the element F$k$ the output of which is connected to a corresponding lead LF$k$.

As will be explained hereinafter, these signals on the leads LF$h$ and LF$k$ serve to actuate travel direction relays. Since the travel direction relay has to be maintained in switched-in position until the braking zone of the desired stop is reached it is also necessary that the travel direction signal be maintained until this moment. According to the construction of the control member for determining the cabin position, either the input signals for the elements F$g$ and F$i$ respectively and thus the output signals thereof are maintained, or the output signal of the elements F$g$ and F$i$ respectively is stored over a memory element until the braking zone is reached.

Figure 2:
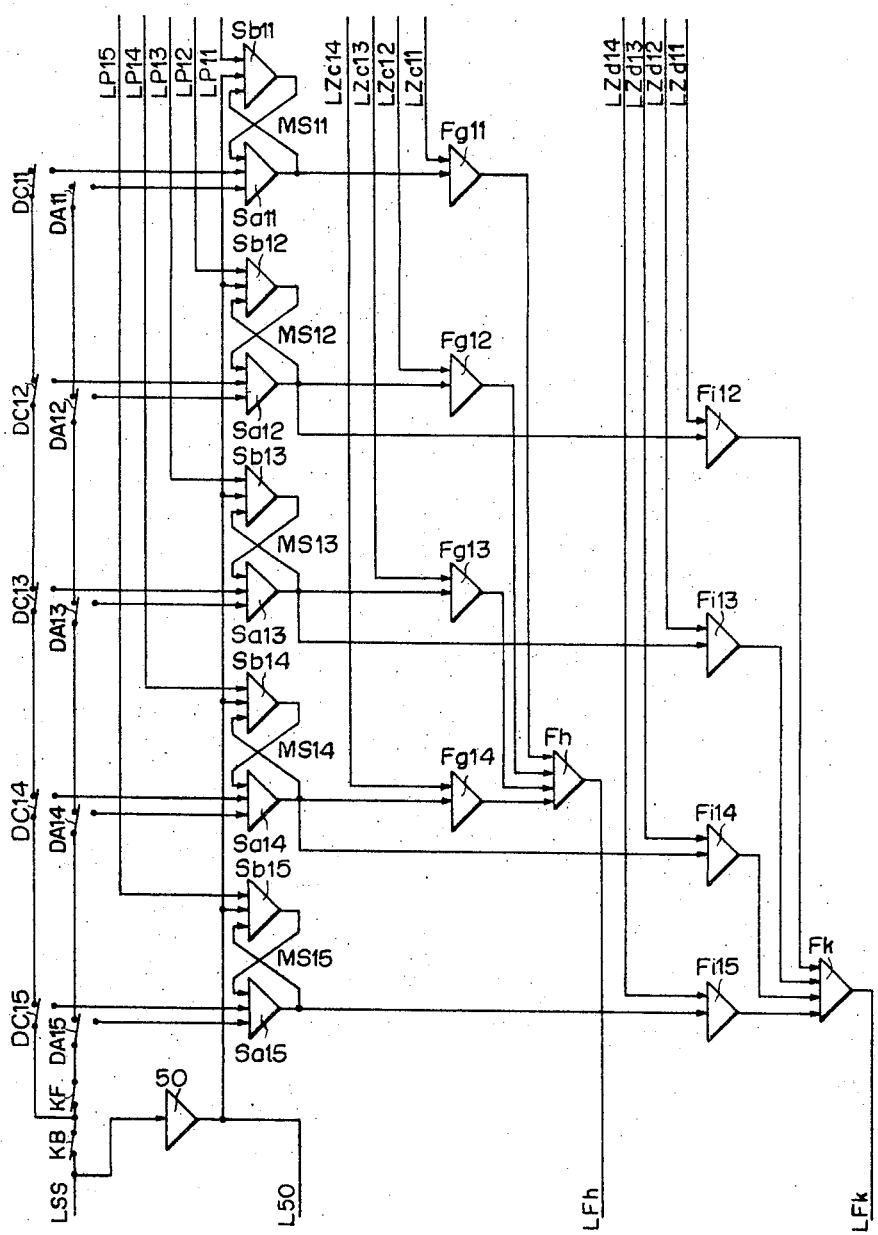
FIGS. 2 and 2a illustrate the floor control of the apparatus of FIG. 1.
Figure 2A:
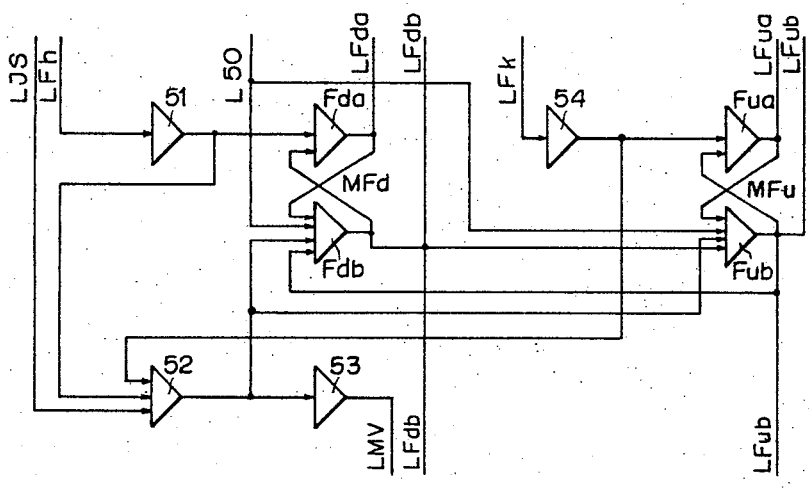

According to FIGS. 3 and 3$a$ the embodiment is based on a control member for determining the cabin position that requires a storing of the travel direction signals of the leads LF$h$ and LF$k$ respectively for a period of a time until the lug F in the desired stop interrupts the signal of the induction switch JS as shown in FIG. 2$a$. The downward signal to the lead LF$h$ is supplied an input to an element 51 the output of which serves an input to an element F$da$ and to an element 52. The element F$da$ forms a part of a memory element MF$d$ consisting of an element F$da$ and of an element F$db$. The output of element F$db$ is connected with the second input of element F$da$ and the output of element F$da$ is connected with the first input of the element F$db$.

The upward signal to the lead LF$k$ is supplied to an element 54 the output of which serves a first input to an element F$ua$, and as a second input to the element 52. The element F$ua$ forms one part of a memory element MF$u$ consisting of the elements F$ua$ and F$ub$. The output of element F$ub$ is connected with the second input of element F$ua$ and the output of the latter is connected with the first input of element F$ub$. The third input of element 52 is formed by the lead LJS. The output of this element 52 on the one hand leads to an element 53 and on the other hand to the second input of the elements F$db$ and F$ub$. The output of element 53 acts onto a lead LMV. The elements F$db$ and F$ub$ each have a third input connected with the lead L50. The fourth input of element F$db$ leads to the output of the element F$ub$ and the fourth input of element F$ub$ leads to the output of element F$db$. These two connections form a reciprocal locking of the travel direction memory elements MF$d$ and MF$u$ in order to prevent that both directions of travelling respond simultaneously. The output of elements F$da$ and F$ua$, respectively further act onto leads LF$da$ and LF$ua$, respectively, and the output of elements F$db$ and F$ub$ respectively acts onto leads LF$db$ and LF$ub$ respectively.

With a control member, the signal of which changes only when the braking zone is reached, the output of the element 51 responsive to the elements F$g$ or the output of the element 54 responsive to the elements F$i$ may directly be used to influence the corresponding travel direction relay.

For the description of the step-by-step switching device according to FIGS. 3 and 3$a$ it shall be assumed that the cabin is at stop 11. The induction switch JS is connected by means of a lead LJS with an element 30 the output of which acts onto a lead L30. In accordance with the direction of travelling of the cabin and as shown in FIG. 2$a$ the floor control produces signals of direction onto leads LF$ub$ for upward travelling and LF$db$ for downward travelling. The lead LF$ub$ leads to the first input of one element 35 of a memory element MF. The lead LF$db$ is connected to the first input of the other element 34. The output of element 35 serves as a second input to element 34 and is further connected with a lead L35. The output of element 34 serves as a second input to element 35 and is further connected to a lead L34.

An element 40 presents three inputs LP11, LP13, and LP15 coming from the corresponding position elements P$e$ described in FIG. 3$a$. The output of element 40 serves as a first input to an element 41 the second input of which is connected to lead L35.

A further element 36 presents two inputs LP12 and LP14 again coming from corresponding position elements P$e$. The output of element 36 serves as a first input to an element 37 the second input of which leads to lead L34. The output of element 37 acts onto the first inputs of elements 38 and 42. The second inputs of these elements lead to the output of element 41. The third input of element 42 is connected to the lead LJS. The output of element 42 supplies the first input of an element 45 of a memory element MSB. The output of element 38 is connected with a first input of element 39 and the second input thereof is connected to the lead LJS. The output of element 39 acts as first input of the other element 46 of the memory element MSB. The output of element 45 is connected on the one hand to the second input of element 46 and on the other hand to a lead L45. The output of element 46 leads on the one hand to the second input of element 45 and on the other hand to a lead L46. The described elements 36 to 42 as well as the memory element MSB form the so-called step limitator designated by SB in FIG. 3.

Advantageously the step-by-step switching device is provided with a correcting means permitting it to assume the corresponding starting position at the end stops, should the step-by-step switching device have been disturbed by outside influences. The correcting means consists of elements 43 and 44. The output of end switch ES$d$ leads over a lead LES$d$ to the first input of element 43. A lead LF$da$ coming from the flat control (FIG. 3$a$) acts as second input to element 43 the output of which serves as a third input to the elements 45 and 46. The element 44 has inputs LF$ua$ and LES$u$ and its output is connected as a fourth input to the elements 45 and 46.

The diagram shown in FIG. 3$a$ represents on the one hand $n-1$ zone units designated by Z11 to Z14 and on the other hand the position units generally designated by P and identical with the number of floors. A zone unit Z consists of a memory element M having elements Z$c$ and Z$d$ and correspondingly connected elements Z$a$ and Z$b$ responsive to the travelling direction. A position unit consists of a position element P$e$ and of a signal element PS.

The elements Z$a$ and Z$b$ usually comprise four inputs. The first input is connected to the lead L30. The second input of elements Z$a$ and Z$b$ which are designated with an even index of number are connected with the lead L45 and the second input of these elements Z$a$ and Z$b$ having odd index of numbers are connected with lead L46. The third input of the elements Z$a$ is connected with the lead L35 and the third input of the elements $Zb$ is connected with lead L34. The fourth input of the elements $Za$ leads to the output of the corresponding elements $Zc$ having the index of numbers minus 1 and the fourth input of the elements $Zb$ leads to the output of the corresponding elements $Zd$ with the index of the number plus 1. Since no further zone unit is connected before the zone unit Z11 and since no further zone unit is connected after zone unit Z14 the fourth input is missing at element $Za$11 and at the element $Zb$14, respectively.

Within the same zone unit the elements are connected as follows: Element $Zc$ presents two inputs. The first input is connected with the output of element $Za$ and the second input is connected with the output of element $Zd$. The element $Zd$ also presents two inputs the first of which leads to the output of element $Zb$ and the second of which to the output of element $Zc$.

The position elements $Pe$ have two inputs. The first thereof is connected with the output of the element $Zd$ of the same index of number and the second thereof is connected with the output of the element $Zc$ having the index of number minus 1. The outputs of the elements $Zc$ and $Zb$ respectively further lead to corresponding leads $LZc$ and $LZd$ respectively which lead to the corresponding elements $Fg$ and $Fi$, respectively (FIG. 2) determining the travel direction. The signals guided through these leads to the elements $Fg$ and $Fi$ respectively, are compared in these elements with the call signals coming from the elements $Sa$ and the output signals of the elements $Fg$ and $Fi$ respectively, determine the travel direction. The element $Pe$11 has only one input since no further zone units are connected before the zone unit Z11. Also element $Pe$15 has only one input since there is no zone unit having the same index of number. The outputs of the elements $Pe$ lead on the one hand to the corresponding lead LP with the corresponding index of number and on the other hand to a corresponding signal element PS.

Figure 4:
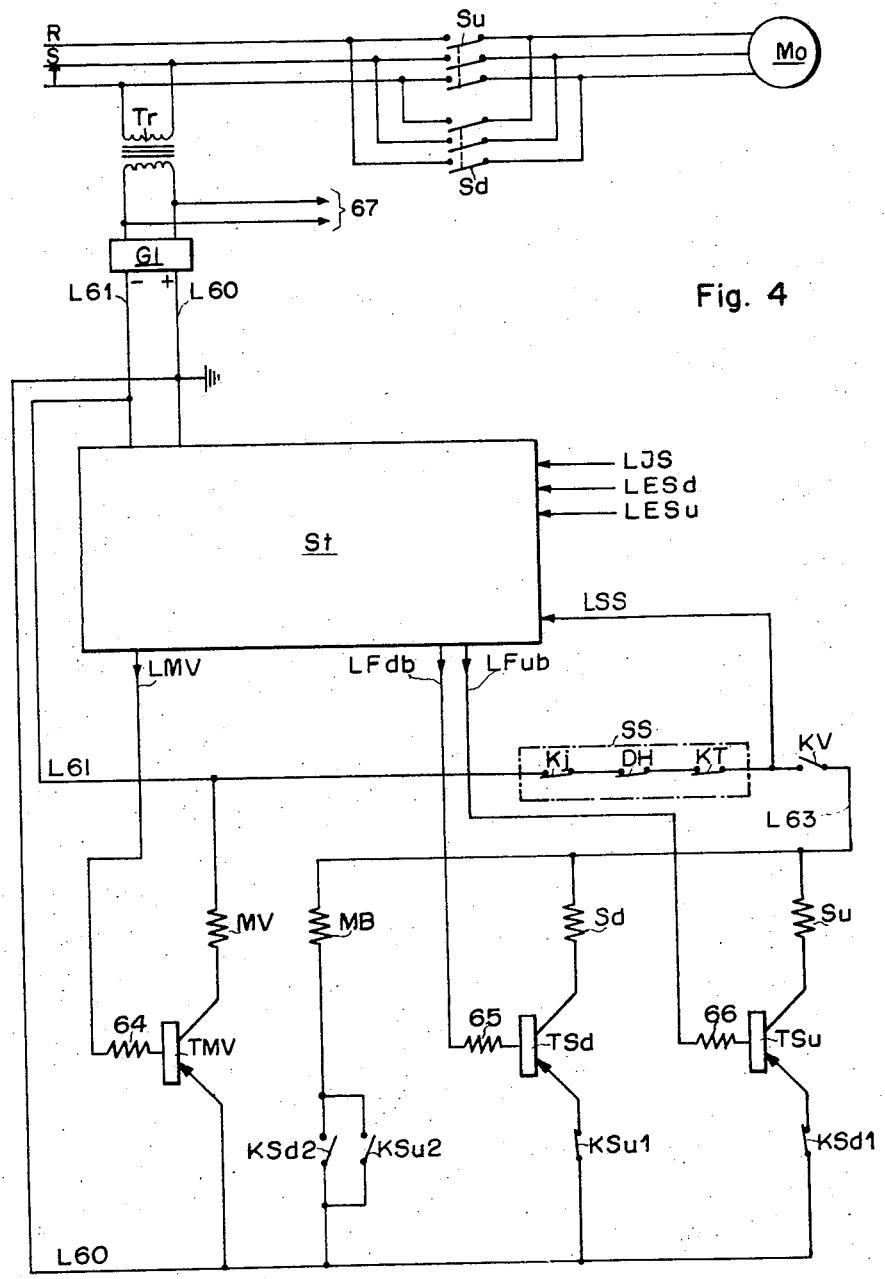
FIG. 4 shows a further part of the elevator control.

The motor $Mo$ of the drive is supplied according to FIG. 4 from a mains RST over relays for the direction of travelling $Su$ and $Sb$. The primary winding of a transformer $Tr$ is connected with the leads S and P, while the secondary winding leads on the one hand to a rectifier G1 and on the other hand over a lead 67 to the primary winding 24 of the induction switch JS. One output of the rectifier G1 is connected to grounded lead L60 and the other output to a lead L61. The two leads L60 and L61 supply the control $St$ as described for FIGS. 2, 2a, 3 and 3a. The pulsating direct current on the secondary side of the rectifier G1 is smoothed in a known way. The inputs LJS, LES$d$, LES$u$ and LSS lead to the control $St$. The object of the first three inputs have already been described. The lead L61 is connected to a safety circuit SS consisting of a contact KJ of the catching device, a stop button DH and door contacts KT. The output of the safety circuit SS on the one hand leads over lead LSS to the control $St$ and on the other hand over contacts KV for the locking check of the door to a lead L63. For the sake of clarity only one of the contacts KT and KV have been represented.

The control $St$ has the three already described outputs LMV, LF$db$ and LF$u$. The output LMV is connected over a resistance 64 with the base of a transistor TMV. The emitter of this transistor TMV is connected with the lead L60 and the collector leads over the coil of a door locking magnet MV to lead L61. The output LF$db$ is connected with the base of a transistor TS$d$ over a resistance 65. The emitter of the transistor TS$d$ leads over an auxiliary contact KS$u$1 of the direction switch $Su$ to the lead L60 and the collector of the same transistor is connected with the lead L63 over a relay coil $Sd$.

The output LF$ub$ is connected over a resistance 66 with the base of a transistor TS$u$ the emitter of which is connected over an auxiliary contact KS$d$1 with the lead L60 and the collector of which is connected over a relay coil $Su$ with the lead L63. The lead L63 is further connected over the coil of the braking magnet MB and over the auxiliary contacts KS$d$2 and KS$u$2 connected in parallel with the relays $Sd$ and $Su$ with lead L60.

Figure 5:
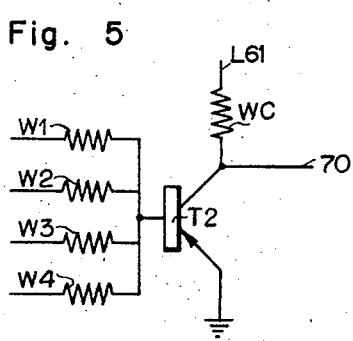
FIG. 5 is a transistor connected as a "nor"-element.

The main part of the "nor"-element according to FIG. 5 advantageously consists of a transistor T2. The inputs are connected with the base of this transistor over voltage responsive resistances, for example those designated by W1, W2, W3 and W4. The emitter of this transistor T2 is grounded while its collector leads over a resistance WC to the negative supplying line L61 of the control. Further the collector is connected with the output 70 of the "nor"-element. The input resistances W of the "nor"-element may also be replaced by diodes whereby the latter act onto the base over an additional resistance.

Figure 6:
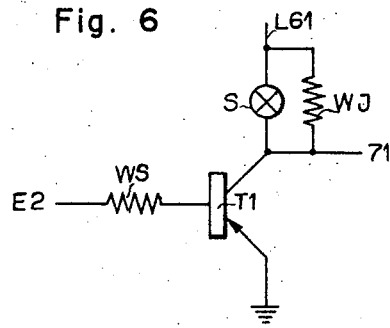
FIG. 6 shows a signal element.

The signal elements PS mentioned in the description are shown for example in FIG. 6. The input is connected over a resistance WS with the base of a transistor T1. Its emitter is grounded and its collector leads over a signal lamp S to the negative supply line L61. The collector is connected with the output 71. A resistance WJ is associated with signal lamp S in order to avoid disturbances of the output effect onto the control should the signal lamp S burn out.

The function of the step-by-step switching device shall now be explained in more detail with reference to an example of travelling. According to the preceding description the cabin 20 is at rest at stop 11. From the description, it further appears that the lead LJS (FIG. 3) has a signal 0 and thus that lead L30 carries a signal 1. Therefore all outputs of the elements $Za$ and $Zb$ (FIG. 3a) are 0. Since the cabin as the last travelling effected a downward movement to stop 11 the elements $Zc$ have an output 1 and the elements $Zd$ have an output 0. Thus the element $Pe$11 has an output 1 while the other elements $Pe$ have an output 0. Thus the signal element PS11 receives an input 1 resulting in a lighting of the corresponding position lamp.

In the mentioned rest position of cabin 20 the elements of FIG. 3 show the following states: $30=1, 34=0—35=1, 36=1—37=0—38=1—39=0, 40—0—41=0—42=1—45=0—46=1, 43=0, 44=0$.

It shall be assumed that the outside calling button DA15 (FIG. 2) is actuated. The signal 1 of the button DA15 brings the outputs of the following elements into the states: $Sa15=0—Sb15=1—Fi15=1—Fk=0—54=1—Fua=0—Fub=1$. Since from the elements determining the travel direction, only element $Fi$15 has two inputs with the value 0 only this element may have an output 1 whereby the direction "up" is predetermined. The output signal 1 of element 54 (FIG. 2a) further produces the output states $52=0—53=1$, whereby through the emitter and the base of transistor TMV (FIG. 4) a control current passes which makes selective the emitter-collector circuit and energizes the locking magnet MV. The signal of the direction of travelling LF$ub$ produces a control current in transistor T$su$. By the energization of the magnet MV the contact KV is closed, the relay $Su$ is energized, and the cabin travels upwardly.

Simultaneously the signal of direction of travelling LF$ub$ (FIG. 3) produces from the value 1 the following new output states: $35=0—34=1, 41=1—42=0$ and $38=0—39=1$. Thereby $46=0$ and $45=1$ so that lead L46 carries a signal 0 and lead L45 a signal 1.

Owing to the upward movement of the cabin, the induction switch JS (FIG. 1) comes out of action relative to lug F11 so that the lead LJS (FIG. 2) is supplied with a signal 1. This results in the following new output states: $39=0$ and further $30=0$. The leads (FIG. 3a) L30, L46 and L35 all carry a signal 0 and the leads L45 and L34 a signal 1. These states result in that all inputs of the element $Za$11 are 0 while all other elements $Za$ and $Zb$ at least have one input with the value 1. This results in the following new output states: $Za11=1—Zc11=0—Zd11=1—Pe11=0—40=1—41=0—38=1, Pe12=1$ —36=0. Since the element P$e$12 has received the output 1, the step-by-step switching device is in position 12. As soon as the induction switch JS reaches the lug F12 the signal carried by lead LJS changes from 1 to 0. This leads to the following new output states: 42=1—45=0 —46=1, 30=1. Therefore the output of Z$a$11 becomes 0.

Upon further travelling of the cabin, the output state of the elements Z$a$12, Z$a$13, and Z$a$14 respectively are modified analogously when the induction switch JS leaves the lugs F12, F13 and F14 respectively, resulting in a modification of the state of the elements P$e$13, P$e$14 and P$e$15 respectively.

As soon as the position element P$e$15 has an output signal 1 the element S$b$15 (FIG. 3) receives an output 0 and the element S$a$15 an output 1. Simultaneously the output of Z$d$14 becomes 1 and the following new output states are produced: F$i$15=0—F$k$=1—54=0. In spite thereof the elevator continues its upward travelling since the order for upward travelling is and remains stored in the memory element MFU (FIG. 2).

As soon as the sliding path 26 actuates the end switch ES$u$ a signal 0 is produced in lead LES$u$ (FIG. 3). This results in an output 1 for the element 44 and therefore in an output 0 for the elements 45 and 46 each. This further results in all inputs of the elements Z$a$ (FIG. 3$a$) becoming 0 so that all zone units Z are brought into the initial position for downward travelling produced that this had not already happened by the normal control sequence.

As soon as the induction switch JS reaches the lug F15 the signal in lead LJS (FIG. 3$a$) becomes 0. Since the output signal of element 54 became 0 shortly before the following new output states are produced: 52=1—53=0, which releases the locking magnet MV (FIG. 4). Further F$ub$ becomes 0 and F$ua$=1 so that the control signal for the transistor TS$u$ is interrupted and the relay S$u$ is released. The auxiliary contact KS$u$2 opens and brings the brake B into operation.

When the desired stop is reached the output of element 44 (FIG. 3) becomes 0. In this position of the cabin, the output values of the elements in the step limitator SB are the following: 40=0—41=1—42=0, 36=1—37=0—38=0—39=1—46=0—45=1.

It shall now be assumed that a passenger enters the cabin at stop 15 and actuates the push button DC11. The signal 1 produced by push button DC (FIG. 2) results in the following new output states: S$a$11=0—S$b$11 =1—F$g$11=1—F$h$=0—51=1—F$da$=0—F$db$=1. Thereby the direction of travelling "down" is predetermined. The output signal 1 of element 51 (FIG. 2$a$) further produces the output states 52=0—53=1, so that transistor TMV (FIG. 4) becomes conductive and energizes the locking magnet MV. The travel direction signal in lead F$db$ produces a control current in transistor ES$d$. By the energization of the locking magnet MV, the contact KV is closed, the relay S$d$ is energized, and the cabin travels downwardly.

Simultaneously the travel direction signal in lead LF$db$ (FIG. 3) produces from the value 1 the following new output states: 34=0—35=1, 41=0—38=1—39=0, 42=1—45=0—46=1, so that lead L46 has a signal 1 and lead L45 has a signal 0.

By the downward movement of the cabin the induction switch JS leaves the zone of the lug F15 so that the lead LJS is supplied with a signal 1. This results in the following new output states: 45=0 and further 30=0. The leads L30, L45 and L34 (FIG. 3$a$) carry a signal 0 and the leads L46 and L35 a signal 1. These states result in all inputs of the element Z$b$14 being 0, while all other elements Z$a$ and Z$b$ have at least one input with the value 1. This results in the following new output states: Z$b$14=1—Z$d$14=0—Z$c$14=1—P$e$15=0—40=1, P$e$14=1—36=0—37=1—38=0. Since the element P$e$14 has received the output 1 the step-by-step switching device is in position 14.

As soon as the induction switch reaches the lug F14 the signal in lead LJS (FIG. 3) changes from 1 to 0. This results in the following new output states: 39=1—46 =0—45=0, 30=1. Thus Z$b$14 becomes 0 (FIG. 3$a$).

Upon further travelling of the cabin, the output states of the elements Z$b$13, Z$b$12 and Z$b$11, respectively are modified analogously when the induction switch JS leaves the lugs F14, F13 and F12 respectively, resulting in a modification of the state of the elements P$e$13, P$e$12 and P$e$11 respectively.

As soon as the position element P$e$11 receives an output signal 1, the element S$b$11 (FIG. 1) modifies its output to 0 and the element S$a$11 to 1. Simultaneously the output of Z$c$11 becomes 1 and the following new output states are produced: F$g$11=0—F$h$=1—51=0. In spite thereof, the elevator continues it downward travelling since the order for downward travelling remains stored in the memory element MV$d$ (FIG. 2$a$).

As soon as the sliding path actuates the end switch ES$d$, a signal 0 is produced in lead LES$d$ (FIG. 3). This results in an output 1 for the element 43 and therefore in an output 0 for the elements 45 and 46 each. This results in that all inputs of the elements Z$b$ (FIG. 3$a$) become 0 so that all zone units are brought into the initial position for upward travelling provided that this has not already occurred by the normal control sequence.

As soon as the induction switch JS reaches the lug F11, the signal in lead LJS (FIG. 2$a$) becomes 0. Since the output signal of the element 51 became 0 shortly before, the following new output states are produced: 52=1—53 =0 so that the locking magnet MV (FIG. 4) is released. Further F$db$=0—F$da$=1, so that the control signal for the transistor TS$d$ is interrupted and the relay S$d$ is released. The auxiliary contact KS$d$2 opens and brings to action the brake B.

When the desired stop is reached the output of element 43 (FIG. 2) becomes 0. In this position of the cabin the output values of the elements in the step limitator SB are the following: 36=1—37=0—38=1—39 =0, 40=0—41=0—42=1—45=0—46=1.

We claim:

1. An elevator control system comprising a cabin adapted for moving between floors, call responsive memory elements, a control member adapted to indicate the position of the cabin, and first and second groups of floor elements operatively associated with the floors for controlling the direction of travel of the cabin, said memory elements and said control member being coupled to the floor elements whereby the latter can determine the direction of travel of the cabin, said control member comprising a step-by-step switching device including a plurality of zone units each corresponding to a respective one of said floors, each said zone unit having one output for acting on the floor element associated with the respective floor of one of said groups for controlling the downward direction of travel of the cabin, and a second output for acting on the floor element associated with the respective floor of the other of said groups for controlling the upward direction of travel of the cabin, all of said elements being statical elements.

2. An elevator control system as claimed in claim 1 wherein each of the call responsive memory elements has an output providing a first input to each of the floor elements, so that the floor elements of each group are provided with inputs from a respective one of the call memory units and a respective one of the zone units, relay control memory elements, a further element for each of said relay control memory elements, said floor elements having an output coupled to said further elements to produce an output for the corresponding relay control memory element, each of the relay control memory elements consisting of two elements influencing each other, a safety circuit adapted to influence one of the elements of each of the relay control memory elements, means for influencing the other of the elements of the relay control memory elements, means for effecting reciprocal locking of the two elements of each of the relay control memory elements, and a travel direction relay for each of the relay control memory elements, the elements of the relay control memory elements having outputs for influencing the corresponding travel direction relay.

3. An elevator control system as claimed in claim 2 in which each statical element consists of a transistor including a grounded emitter, a collector adapted for being coupled through a resistance to a source of negative voltage and a base connected to resistances for receiving signals.

4. An elevator control as claimed in claim 3 comprising diodes coupled to said base and to said resistances.

References Cited in the file of this patent
UNITED STATES PATENTS

| | | |
|---|---|---|
| 2,589,292 | Santini | Mar. 18, 1952 |
| 2,624,425 | Eames | Jan. 6, 1953 |